US009330501B2

(12) United States Patent
Sahoo et al.

(10) Patent No.: US 9,330,501 B2
(45) Date of Patent: May 3, 2016

(54) SYSTEMS AND METHODS FOR AUGMENTING PANORAMIC IMAGE DATA WITH PERFORMANCE RELATED DATA FOR A BUILDING

(75) Inventors: Keshaba Chandra Sahoo, Berkeley, CA (US); Ramtin Attar, Toronto (CA); Ronald Poelman, San Rafael, CA (US); Azam Khan, Aurora (CA)

(73) Assignee: AUTODESK, Inc., San Rafael, CA (US)

( * ) Notice: Subject to any disclaimer, the term of this patent is extended or adjusted under 35 U.S.C. 154(b) by 626 days.

(21) Appl. No.: 13/590,014

(22) Filed: Aug. 20, 2012

(65) Prior Publication Data

US 2014/0049537 A1    Feb. 20, 2014

(51) Int. Cl.
*G09G 5/00*    (2006.01)
*G06T 19/00*    (2011.01)
*G09G 5/02*    (2006.01)

(52) U.S. Cl.
CPC .............. *G06T 19/006* (2013.01); *G09G 5/026* (2013.01); *G09G 2340/10* (2013.01); *G09G 2340/12* (2013.01)

(58) Field of Classification Search
CPC ............ G06F 17/5004; G06F 17/5068; G06F 2203/04802; G06F 3/0481; G06F 3/0482; G06T 15/20
USPC ........................................................ 345/636
See application file for complete search history.

(56) References Cited

U.S. PATENT DOCUMENTS

| 8,115,763 B2 * | 2/2012 | Woop et al. .................... 345/420 |
| 2008/0062167 A1 * | 3/2008 | Boggs et al. ................... 345/419 |
| 2011/0012901 A1 * | 1/2011 | Kaplanyan ..................... 345/426 |
| 2014/0002440 A1 * | 1/2014 | Lynch ..................... G06T 19/00 345/419 |

OTHER PUBLICATIONS

Khan et al.; "Toward a Unified Representation System of Performance-Related Data;" May 19, 2010; eSim2010; 6th IBPSA Canada Conference; pp. 117-124.*
Nebiker et al.; "Rich point clouds in virtual globes—A new paradigm in city modeling?"; Nov. 2010; Computers, Environment and Urban Systems vol. 34, Issue 6; pp. 508-517.*
Chen; Quicktime VR—An Image-Based Approach to Virtual Environment Navigation; 1995; pp. 1-10.*

* cited by examiner

*Primary Examiner* — Peter Hoang
(74) *Attorney, Agent, or Firm* — Artegis Law Group, LLP

(57) ABSTRACT

A system and method for augmenting panoramic images with performance related data for a building are disclosed. The system includes a memory coupled to a processor configured to receive panoramic image data, generate a digital image based on the panoramic image data, and modify the digital image to include a graphical representation of the performance related data. The processor maps performance related data to the coordinate system of the panoramic images such that the graphical representation may be generated without converting the panoramic image data into a high-quality, three-dimensional model in a CAD program. In this way, computer-generated graphical representations of building performance data, such as temperature fields or virtual structures, may be overlaid directly onto a two-dimensional projection of the panoramic image data. In one embodiment, the panoramic image data is a spherical, 360 degree panoramic image captured by a laser scanning device.

22 Claims, 13 Drawing Sheets

Floorplan 300

Figure 4A  Floorplan 300

Image 410

SYSTEMS AND METHODS FOR AUGMENTING PANORAMIC IMAGE DATA WITH PERFORMANCE RELATED DATA FOR A BUILDING

BACKGROUND OF THE INVENTION

1. Field of the Invention

The invention relates generally to modeling and simulation software and, more specifically, to systems and methods for augmenting panoramic image data with performance related data for a building.

2. Description of the Related Art

Environmentally-responsible design goals are an important aspect of many modern architectural projects. An efficient building design not only reduces the impact of urbanization on the environment, but also may reduce operating expenses for the building occupants and creates a better and more useable space to work or live. Furthermore, building efficiency is not a fixed target that may be assessed during the initial design stage but, instead, is a moving target that may evolve over time to respond to changing patterns of building occupancy and the context in which the building is used. Many buildings, once constructed, may be outfitted with instruments that can generate performance related data that provides feedback on the dynamic efficiency of the building throughout the life of the building.

Conventionally, performance related data may be analyzed to determine possible solutions to increase the efficiency of the building or future designs for a new building. For example, lighting or air conditioning systems may be adjusted in areas of the building that have low levels of occupancy during certain times in the day. Typically, performance related data is represented in two-dimensional charts or graphs that plot the data against some reference frame, such as over the course of a day or a year. In addition, the performance related data may be used as input to run various simulations. Such simulations may provide useful information related to, among other things, the intensity and temperature of airflow within the building. The performance related data may also be presented in a graphical context. In one technique, the performance related data may be overlaid over a two-dimensional (2D) floor plan of the building. In another technique, a three-dimensional (3D) model of a building is created using conventional computer aided drafting (CAD) techniques. The building performance data may then be used as metadata when rendering and displaying a view of the 3D model.

There are many drawbacks to these techniques for presenting performance related data to users. For example, in the case of displaying the performance related data over a 2D floor plan, the floor plan may not convey the volume of the building and the relative positioning of lights, vents, and other objects or fixtures within the building. On the other hand, displaying building performance data in a complete 3D CAD model requires a user to generate the model using CAD software in addition to collecting the performance related data. Creating accurate building models may be time consuming and expensive.

As the foregoing illustrates, what is needed in the art is an effective mechanism for visualizing performance related data in a detailed 3D context without having access to a detailed 3D CAD model of the building.

SUMMARY OF THE INVENTION

One example embodiment of the present invention sets forth a method for augmenting panoramic images with performance related data for a building. The method includes the step of receiving panoramic image data that includes color information for a first plurality of pixels, where each pixel in the first plurality of pixels is associated with metadata in addition to the color information. The method further includes the steps of generating a digital image that comprises a second plurality of pixels corresponding to a two-dimensional projection plane associated with at least a portion of the panoramic image data and modifying the digital image to include a graphical representation of performance related data based on the metadata included in the panoramic image data.

Another example embodiment of the present invention sets forth a computer readable storage medium containing a program which, when executed, performs an operation for performing the method set forth above. Yet another example embodiment of the present invention sets forth a system that includes a memory for storing one or more panoramic digital images and a processor configured to perform the method set forth above.

One advantage of the disclosed approach is that a user may visualize the performance related data within the context of the structure of the building without the added step of generating a detailed 3D model of the building. By converting the performance related data to the coordinate system defined by the panoramic images (i.e., a spherical image plane), a user may view the performance related data within the context of a high resolution photograph of the building without needing to generate and render a detailed 3D model. Generating a set of panoramic images may be cheaper and less time consuming than generating a detailed building model, while providing a user with a level of detail in the rendered virtual environment that is equal to or better than the rendered view of the 3D model.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A and 4B illustrate a rendering technique for visualizing a set of spherical panoramic images, according to one example embodiment of the present invention;

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
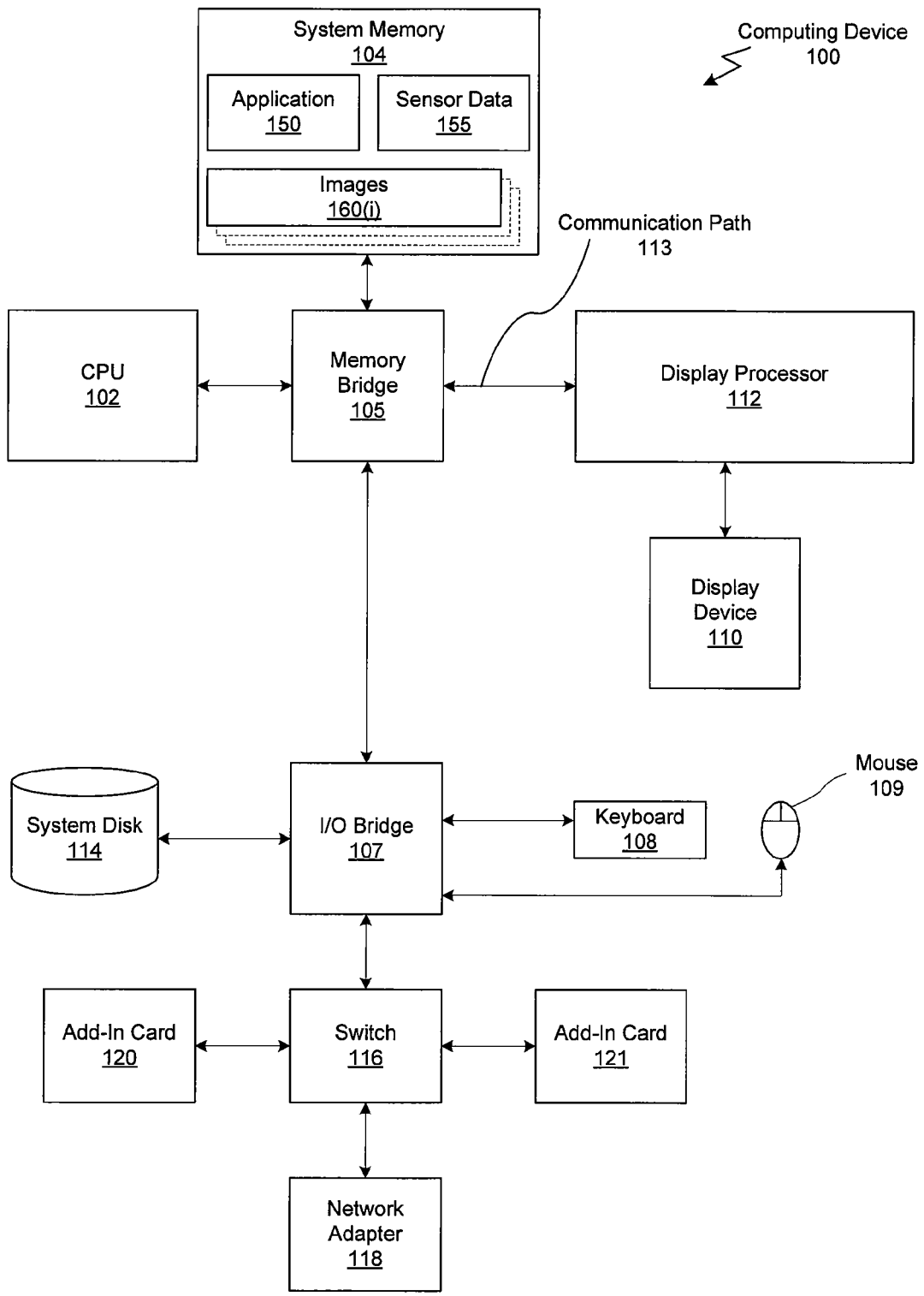
FIG. 1 is a block diagram of a computing device configured to implement one or more aspects of the present invention.

FIG. 1 is a block diagram of a computing device 100 configured to implement one or more aspects of the present invention. Computing device 100 may be a computer workstation, personal computer, or any other device suitable for practicing one or more embodiments of the present invention. As shown, computing device 100 includes one or more processing units, such as central processing unit (CPU) 102, and a system memory 104 communicating via a bus path that may include a memory bridge 105. CPU 102 includes one or more processing cores, and, in operation, CPU 102 is the master processor of computing device 100, controlling and coordinating operations of other system components. System memory 104 stores software applications and data for execution or processing by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 may be configured to provide display device 110 with either an analog signal or a digital signal.

A system disk 114 is also connected to I/O bridge 107 and may be configured to store content, applications, and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network, and may include wired or wireless communication over local area networks and wide area networks such as the Internet.

Other components (not shown), including USB or other port connections, audio processors, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or a graphics memory within display processor 112. In one embodiment, display processor 112 includes 3D rendering capabilities for generating pixel data for output images from instructions and data defining the geometry, lighting, shading, texturing, motion, and/or camera parameters for a scene. Display processor 112 can further include one or more programmable execution units capable of executing shader programs, tone mapping programs, and the like.

In one embodiment, application 150, sensor data 155, and one or more digital images 160($i$) are stored in system memory 104. Application 150 is configured to cause computing device 100 to display a graphical representation of performance related data for a building on display device 110. For example, application 150 may receive sensor data 155 that includes performance related data collected from one or more sensors associated with a building as well as pixel data from one or more of the images 160 to generate a 2D graphical representation of the performance related data for display. In one embodiment, application 150 may generate an image for display that includes pixel data from one of the images 160 along with text overlaid on the pixel data to show the performance related data for a portion of the building.

In one embodiment, application 150 is a stand-alone, binary executable file that includes instructions configured to be executed by CPU 102. Application 150 may generate graphical representations of the images 160 and performance related data for display on display device 110. In another embodiment, application 150 is a server application that generates the graphical representations for display in a remote web browser, such as Microsoft® Internet Explorer, Mozilla® Firefox, Google® Chrome, or the like, configured to display web pages that include graphical representations of the performance related data. In some embodiments, the graphical representations may be static images augmented by the display of metadata, such as with textual overlays or graphical overlays. In other embodiments, the graphical representations may be dynamic images that allow a user to navigate through a virtual environment providing viewpoints from a plurality of locations.

It will be appreciated that the computing device shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Sensor data 155 is performance related data collected from one or more sensors placed throughout a building. The data may be collected manually and stored in system memory 104. Alternatively, sensor data 155 may be collected automatically from one or more sensors configured to transmit data to computing device 100. For example, airflow sensors placed near vents in the building may be queried by application 150 to collect performance related data for the vents. The sensor data 155 may provide the application 150 with information about the air flow or air temperature at a particular vent in the building.

Images 160($i$) are digital images captured at one or more locations throughout a building. In one embodiment, the images 160 are spherical panoramic images generated by using a 360 degree (360°) scanning technique. For example, the images 160 may be captured using a one-shot lens technique that is used in conjunction with a hemi-spherical mirror. However, such images may be subject to distortion from the curvature of the mirror. Another technique rotates a camera around a central axis and scans vertical lines of pixels at each orientation as the camera rotates, generating the digital image 160. Yet other techniques involve capturing simultaneous images from a plurality of conventional image sensors that are oriented in different directions around a central axis and stitching together a panoramic digital image from the plurality of captured images using software techniques that are well-known to those of skill in the art. The format of images 160($i$) is discussed in more detail below in conjunction with FIGS. 6A and 6B.

Figure 2:
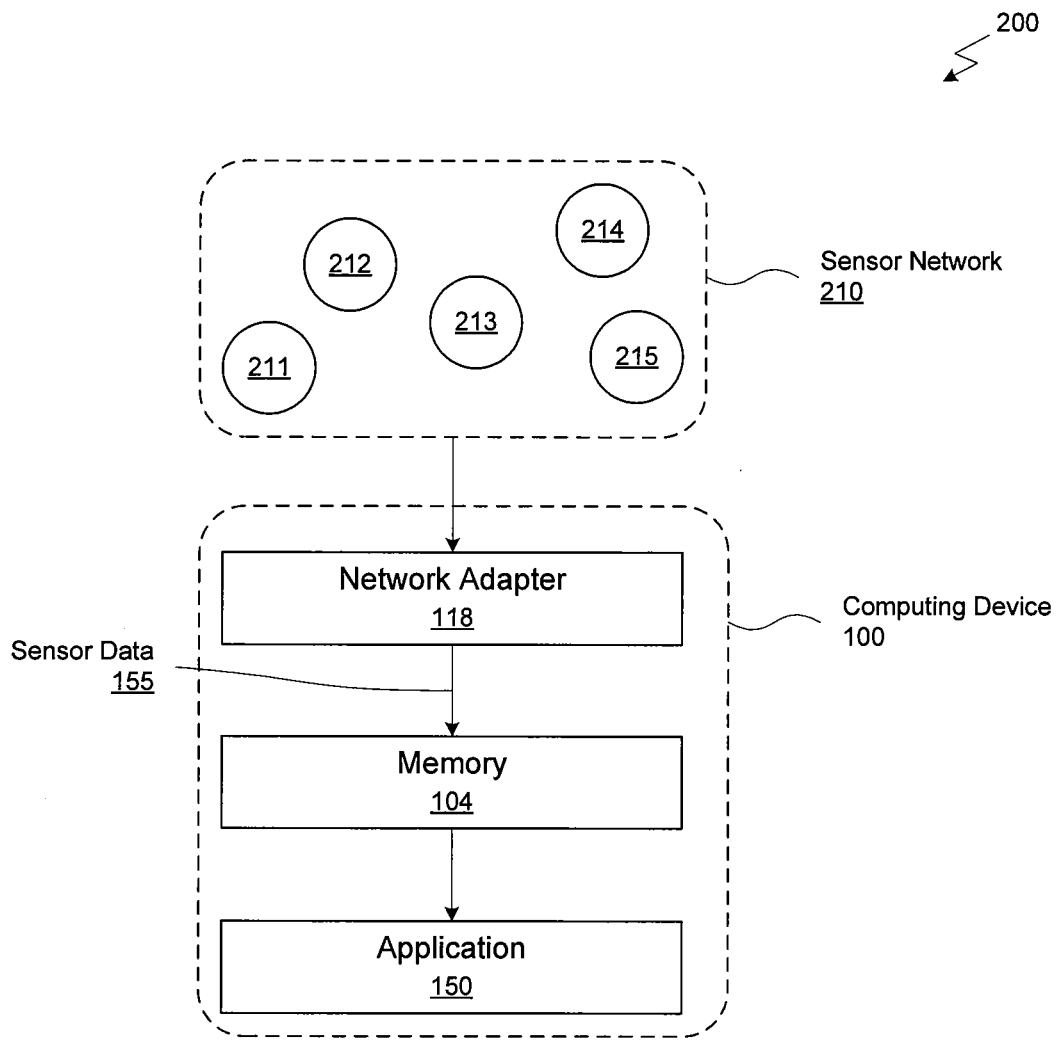
FIG. 2 is a block diagram of a system configured to collect and display performance related data for a building, according to one embodiment of the present invention.

FIG. 2 is a block diagram of a system 200 configured to collect and display performance related data for a building, according to one embodiment of the present invention. As shown, system 200 includes computing device 100 of FIG. 1 coupled to a sensor network 210. Sensor network 210 includes one or more sensors (211, 21, 213, 214, 215, etc.) configured to monitor and collect performance related data associated with a building. For example, sensor 211 may be an airflow sensor that is placed near an air vent in the building to monitor the temperature and velocity of the air passing through the air vent. Sensors 212 and 213 may be light switch monitors that monitor whether a particular light is turned on at any given time. Sensor 214 may be a current sensor that monitors the amount of electricity consumed at a particular electrical outlet or by a particular electrical circuit in the building. Sensor 215 may be a thermostat sensor that indicates the current setting (or setpoint) for a thermostat. Sensor 215 may be used to monitor the temperature settings for a building. The examples described above are only a small subset of the possible types of sensors that may be included in sensor network 210. Other types of sensors that collect other performance related data are contemplated to be within the scope of the present invention.

Sensor network 210 is connected to computing device 100 to transmit sensor data 155 to computing device 100 and cause sensor data 155 to be stored in system memory 104. In one embodiment, the sensors of sensor network 210 are wireless sensors that are configured to connect to computing device 100 via a wireless network. Network adapter 118 may be a wireless network adapter that is configured to establish a connection with sensors within range of the wireless network adapter 118. In another embodiment, the sensors of sensor network 210 may be hard-wired to computing device 100. Each sensor may be connected to a local area network (LAN) connected via Ethernet. Alternatively, computing device 100 may include an add-in card 120, 121 that is configured with a proprietary sensor interface for receiving sensor data 155 from the sensor network 210. In yet other embodiments, sensor network 210 may include one or more devices configured to collect data from one or more sensors and then forward the aggregated sensor data to computing device 100. In still other embodiments, sensor network 210 may not be connected to computing device 100. In such embodiments, the sensors may store performance related data locally until a user manually transfers the data from the sensor to system memory 104 of the computing device 100. For example, a sensor may have a local memory that is capable of storing performance related data collected over a period of time. The sensor may include a communications interface such as a USB™ (Universal Serial Bus) interface. The user may download the collected data from the sensor to a USB™ flash storage device and then transfer the data from the USB™ flash storage device to system memory 104 via the USB™ interface connected to the computing device 100. Any technically feasible interface may be used to transmit sensor data 155 to computing device 100.

Once sensor data 155 is transferred to computing device 100, sensor data 155 may be transmitted to application 150. Application 150 may be configured to generate a 2D visualization of the sensor data 155 for display via one or more different visualization techniques. For example, raw temperature data from sensor network 210 may be quantized such that each value represents one of a plurality of temperature ranges that are mapped to different colors representative of the measured temperature. The quantized temperature data may then be combined with one or more pixels of an image 160 to generate pixel data for the visualization. When generating pixel data for display on display device 110, pixels associated with warmer temperatures may be skewed to have a red hue while pixels associated with cooler temperatures may be skewed to have a blue hue. In addition, the raw temperature data may be normalized before quantization such that the minimum and maximum values are mapped more closely to the extreme ends of the temperature scale.

Sensor data 155 may be logical data, scalar data, vector data, or semantic data. Logical data are discrete data points with two possible states (i.e., true or false). Logical data may be used to describe the presence or absence of an event, person, object, or a selection. For example, a sensor that collects input related to whether a chair is occupied or whether a light switch is on may be stored as logical data. Such data may be represented by a single bit. Scalar data are continuous one-dimensional values. Scalar data may be used to describe scalar values such as a temperature measurement or energy consumption. For example, a sensor placed near an electrical outlet may be configured to monitor average current draw at the electrical outlet over a certain time period and store the energy consumption as a floating point value that represents the current drawn by the electrical outlet. Vector data are continuous real values with both a direction and magnitude. Vector data may be used to describe vector values such as air velocity. For example, a sensor at an air vent may measure air velocity moving in a direction normal to the surface of the air vent or in one or more directions based on the configuration of baffles in the air vent. Semantic data are information that relates to properties of objects. Semantic data may be associated with objects, such as pixels in an image 160, by adding metadata to the objects. For example, a label can be associated with an object to identify that object within an image. The semantic data may be used to associate data from a particular sensor with an object or pixel within an image of the building.

Figure 3A:
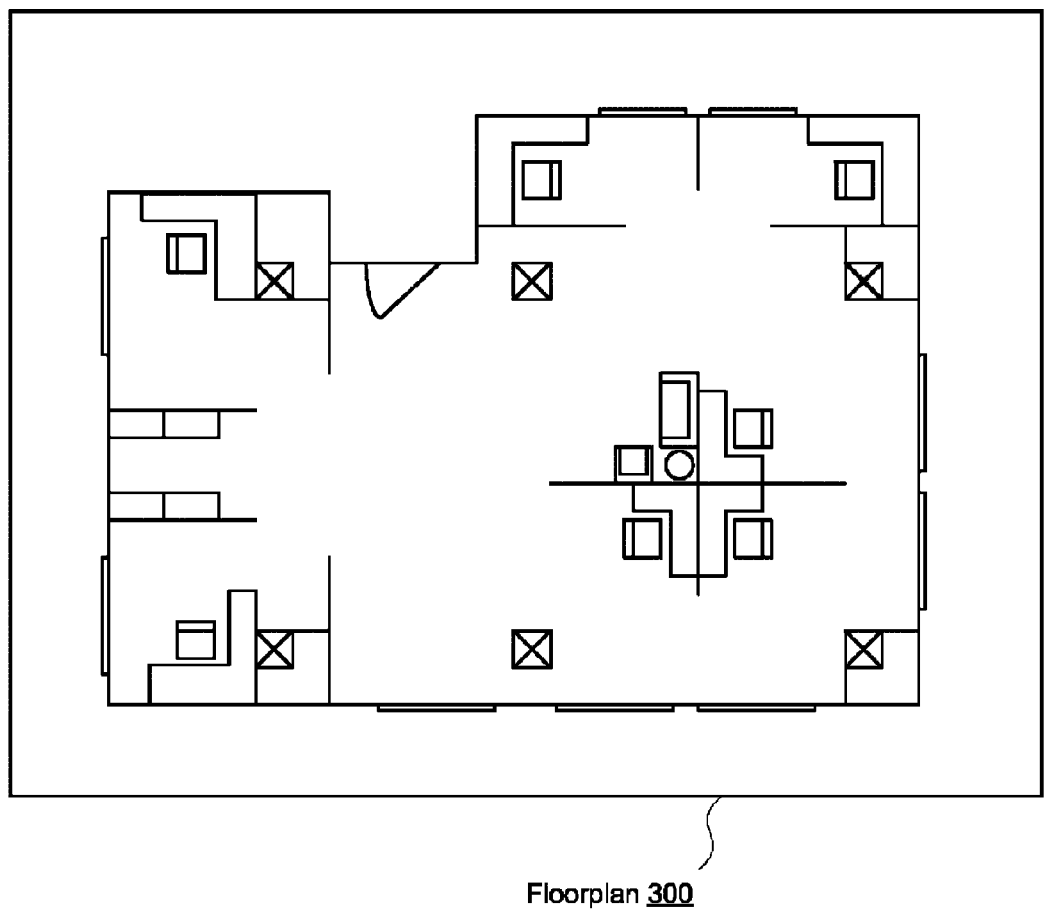
FIG. 3A illustrates a conceptual illustration of a floor plan of a building, according to one example embodiment of the present invention.
Figure 3B:
FIG. 3B illustrates one example of a 3D point cloud captured using a laser scanning device, according to one example embodiment of the present invention.

FIG. 3A illustrates a conceptual illustration of a floor plan 300 of a building, according to one example embodiment of the present invention. As shown in FIG. 3A, floor plan 300 is a top view of a floor of the building that is typically drawn by an architect using CAD software. The floor plan 300 illustrates the layout of structural members of the building such as wall, windows, and doors. Some floor plans may also illustrate the layout of certain fixtures and furniture, such as desks, chairs, file cabinets and the like. As shown, floor plan 300 represents an office building with 4 offices, 3 cubicles, a file storage space, and a seating area. Floor plan 300 is for illustrative purposes of one possible layout of a building.

Conventional techniques for visualizing performance related data for a building (i.e., building performance data) may overlay graphical representations of metadata on top of a 2D view of a floor plan. However, such techniques may not convey building performance data within the 3D context of the building. For example, sensors may collect data related to an air vent illustrated on a floor plan. However, because the floor plan does not connote depth, a user cannot determine whether the vent is located close to the floor of the room or close to the ceiling of the room. Further, users do not get the same immersive virtual experience while viewing 2D technical drawings when compared to viewing high-resolution, images of the building. Therefore, another technique for visualizing building performance data utilizes high-resolution, computer-generated images that show a rendered view of a 3D model of the building.

First, a high-quality 3D model of the building is created using conventional 3D modeling design software (e.g., Autodesk® Building Design Suite). The 3D model comprises surfaces and solid objects that define the components of the building. Then, a computer-generated image of a portion of the building may be generated that shows a simulated view of the building model. Graphical representations of the metadata are then generated and overlaid on top of the computer-generated image.

It will be appreciated that generating a 3D model of a building using CAD software tools may be time consuming and costly. In one approach, a drafter may analyze architectural drawings for the building and generate the 3D model in a CAD program based on the technical specification in the architectural drawings. In another approach, drafters may generate a 3D point cloud approximating the building geometry using a laser scanning device. The drafter may then convert the 3D point cloud into surface geometry to generate the 3D model that is used for generating the computer-generated images. For example, a laser scanning device could be used to capture a 3D point cloud that includes 1.3 billion distinct points having an x-coordinate, y-coordinate, and z-coordinate.

Visualizing building performance data in the context of a computer-generated 3D environment is difficult and costly to create for the reasons set forth above. However, simply by capturing a set of panoramic images simultaneously with point cloud data, as would be performed in preparation for generating a 3D building model, high-resolution data is collected that may be used to generate a similar immersive virtual environment experience without the additional cost of generating the complex 3D building model.

As is known in the art, laser scanning devices may capture a panoramic digital image around a central location by rotating a camera and laser assembly around a fixed pivot point, by using hemispherical lenses that allow a user to capture a 360° view, or by using software techniques to stitch together images captures simultaneously with multiple image sensors. For example, a laser scanning device assembly may be rotated around a pivot point while capturing color information with an image sensor and depth information with a laser device. The resulting data reflects a 360° view around the pivot point as well as associated depth information for each pixel. The depth information represents a distance from the laser scanning device to the surface associated with each pixel. Typically, a laser scanning device is used to capture a point cloud for the building, which is then turned into a 3D model. However, the present disclosure enables the building performance data to be viewed within the context of the captured panoramic images, without the additional step of converting the captured point cloud into a 3D model.

Figure 4B:
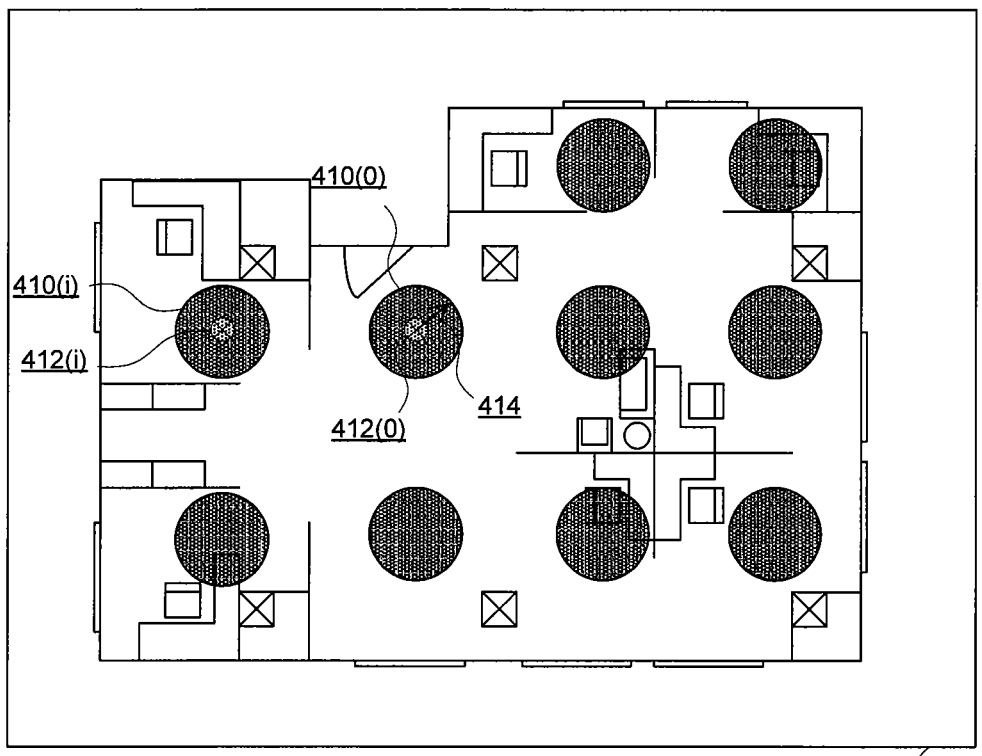
Figure 4B:
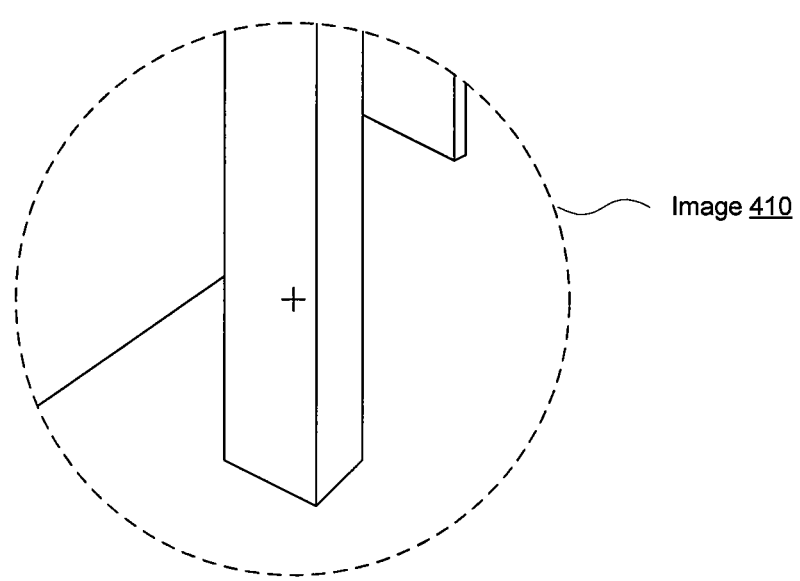

FIGS. 4A and 4B illustrate a rendering technique for visualizing a set of panoramic images 410, according to one example embodiment of the present invention. FIG. 4A is a conceptual illustration for locations 412 associated with a set of panoramic images 410. As discussed above, the panoramic images 410 may be captured using a laser scanning device and each image 410(i) includes a set of pixels associated with color data (e.g., RGB values) as well as depth data (e.g., Z values). In one embodiment, the panoramic images 410 comprise spherical panoramic images that capture color information and depth information for a spherical image plane centered on location 412. In another embodiment, the panoramic images comprise a set of 360 degree panoramic images captured at a constant inclination angle and providing a 360 degree view rotated around a z-axis.

As shown in FIG. 4A, the set of panoramic images 410 may be captured by moving a laser scanning device around the building to form a grid of equally spaced images. For example, the images 410 may be captured on a grid with five foot spacing between image locations 412(i) in both an x-dimension and a y-dimension. In some embodiments, the panoramic images 410 do not conform to an equally spaced grid and each image may correspond to a random location within the building.

Each of the panoramic images 410 may be stored in a memory and indexed with position data that specifies the physical location 412 in the building associated with that image. In one embodiment, each digital image file for the panoramic image 410 includes a header that stores metadata within the digital image file. The metadata may include coordinates (i.e., x, y, and z values) that specify the location 412 associated with the panoramic image 410. In another embodiment, a programmer may link the digital image file to a position that is indexed in a data structure external to the digital image file. For example, the programmer may analyze the set of panoramic images 410 and manually assign each panoramic image 410 a position (i.e., a 3D coordinate) relative to a coordinate system associated with the building. The positions may be stored in a database that pairs a handle for each image (e.g., a filename) with position data. In yet another embodiment, the laser scanning device may include a GPS unit that automatically tags the image with geo-location data. The geo-location data may be used by an application 150 to specify the locations of the panoramic images 410 relative to the coordinate system associated with the building.

In some embodiments, application 150 may enable a user to "register" the set of panoramic images 410 with respect to the coordinate system associated with the building. An image is "registered" by associating each panoramic image 410 in the set of images with a position relative to the coordinate system. The orientation of the panoramic image 410 may also be set relative to the orientation of each of the other panoramic images 410. For example, the first pixel in a first panoramic image 410(0) may correspond to a plane running east-west through the building, and the first pixel in a second panoramic image 410(1) may correspond to a plane running north-south through the building. "Registering" these panoramic images 410 includes not only associating the image with a particular location 412 but also associating the image with a particular orientation relative to a 3D plane.

Each panoramic image 410 includes raw image data captured by the laser scanning device. A computer may generate pixel data for display that represents a 2D projection of the raw image data in the panoramic image 410 based on a projection vector 414. For example, projection vector 414 indicates a direction from the center of a first panoramic image 410(0) toward a column in the building. A subset of pixel data from panoramic image 410(0) may then be processed to generate pixel data associated with a viewing frustrum centered at location 412 and oriented along projection vector 414. FIG. 4B illustrates a circular projection of a subset of the pixel data of the image 410(0). Although a circular shaped 2D projection is illustrated in FIG. 4B, 2D projections in other embodiments may be other shapes (e.g., rectangular), such as to fit the native resolution of a display device 110 or an image format size (e.g., 400 px×300 px) displayed in a container drawn by application 150 (such as an image included in a webpage or an application window).

The set of panoramic images 410 may be stored in a system memory 104 (e.g., as images 160) and processed by application 150 to generate an immersive, virtual experience for a user on display device 110. A user may use navigational controls associated with application 150 to perform a virtual "walk-through" of the building using application 150. The application 150 may display an initial image based on pixel data in a first panoramic image 410(0) located proximate the entrance to the building. The navigational controls enable the user to pan the view "left" or "right" as well as "up" or "down". Panning causes application 150 to generate a new image for display based on a different subset of pixel data in the first panoramic image 410(0). In other words, the image is generated using a camera position centered at the location 412(0) of the first panoramic image 410(0) and oriented according to projection vector 414, which is rotated around the z-axis passing through location 412(0) when panning "left" and "right" or changing the angle of inclination of vector 414 from a zenith of the "sphere" associated with the image 410 when panning "up" or "down". Thus, panning lets the user view the building from any direction from the location 412(0).

The user may "walk" to different areas of the building using additional navigational controls. For example, the user could select a point on the image using an input device such as a mouse. Application 150 may determine a new location associated with the selected point and the select a different image 410(i) that is closest to the new location. The application 150 may then generate a new image based on pixel data in the new panoramic image (e.g., image 410(1)). Because the new panoramic image is generated based on pixel data captured from a new location 412(1) corresponding to the new panoramic image 410(1), the visual experience provided by the stream of images shown on display device 110 appears to "move" in the direction of the location 412 associated with the new panoramic image. In one embodiment, the virtual environment illustrated in FIGS. 4A and 4B is similar to a "street view" mode implemented by the online service provided by Google Maps (located on the Internet at http://maps.google.com), which uses a similar set of panoramic images captured along various roads throughout the world.

Visualization of Performance Related Data for a Building

Figure 5B:
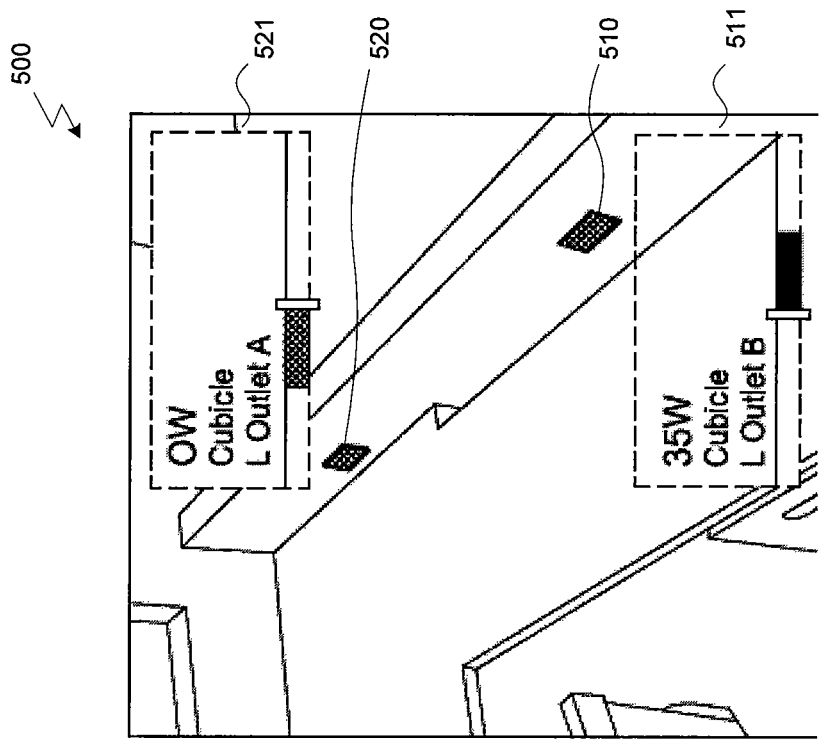
FIGS. 5A and 5B illustrate a rendering technique for displaying performance related data in an image generated based on a spherical panoramic image, according to one example embodiment of the present invention.
Figure 5A:
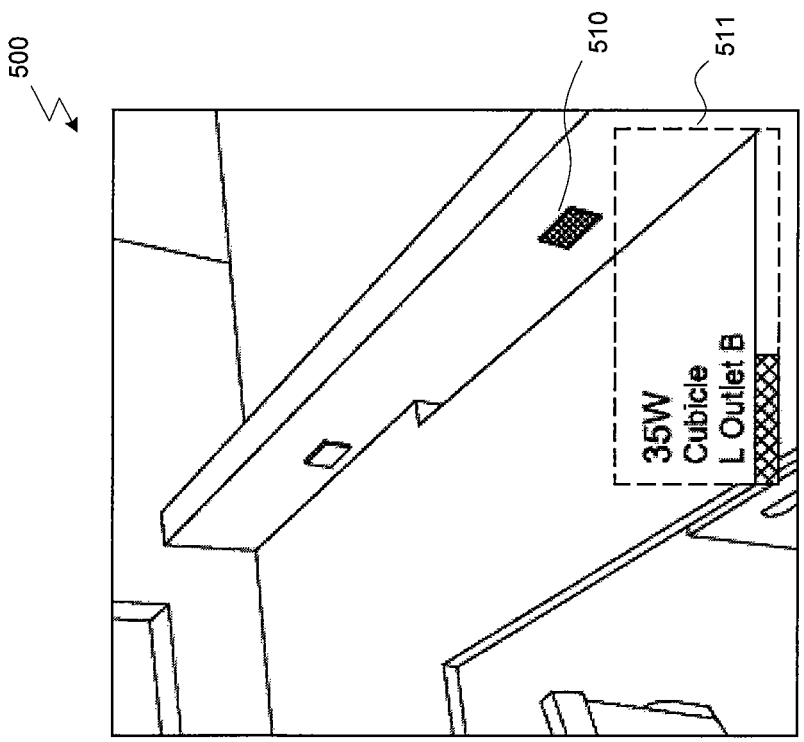

FIGS. 5A and 5B illustrate a rendering technique for displaying performance related data for a building in an image 500 generated based on a panoramic image 410, according to one example embodiment of the present invention. As shown in FIG. 5A, application 150 may render an image 500 based on a panoramic image 410 captured with a laser scanning device. The rendered image 500 includes a graphical overlay or heads-up-display (HUD), such as HUD 511, which displays information related to the building performance data. HUD 511 may display logical data, scalar data, vector data, semantic data, or some combination thereof. For example, HUD 511 includes scalar data ("35 W") associated with the measured energy consumption of electrical outlet 510. HUD 511 also includes semantic data that shows that electrical outlet 510 is identified as "Outlet B" and has a relation to a particular cubicle. In one embodiment, HUD 511 also includes a colored bar at the bottom of the graphical overlay that indicates the percentage of energy consumed by electrical outlet 510 in relation to all electrical outlets in the cubicle or, alternatively, the relative energy use of the electrical outlet 510 in comparison to the average electrical outlet for the building.

As also shown in FIG. 5A, application 150 may combine direct rendering techniques with transient geometry rendering techniques. For example, application 150 has rendered electrical outlet 510 with a green hue in order to distinguish which object in the image is associated with HUD 511. In one embodiment, HUD 511 is located at a position in the image that is proximate to the rendered position of the electrical outlet 510 in the image. In alternative embodiments, HUD 510 may be located anywhere in the image, such as proximate to the right side of the image.

As shown in FIG. 5B, application 150 may render multiple HUDs in the same image 500. HUD 511 is similar to HUD 511 in FIG. 5A and is associated with electrical outlet 510. In addition, a second HUD 521 is associated with a second electrical outlet 520 in the cubicle. HUD 521 is similar to HUD 511 except that HUD 521 displays information related to electrical outlet 520 instead of electrical outlet 510. Outlet 520 is identified as "Outlet A" and also has a relation to the same cubicle as outlet 510. As shown, outlet 520 is consuming 0 Watts of electricity. As also shown in FIG. 5B, the colored bars at the bottom of the HUDs indicate the relative energy use of the electrical outlets 510, 520 in comparison to the average electrical outlet for the building.

Figure 6A:
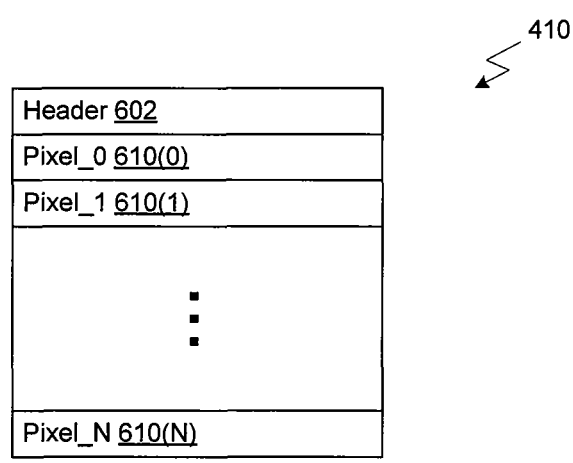
FIGS. 6A and 6B illustrate the file format for a spherical panoramic image file, according to one example embodiment of the present invention.
Figure 6B:
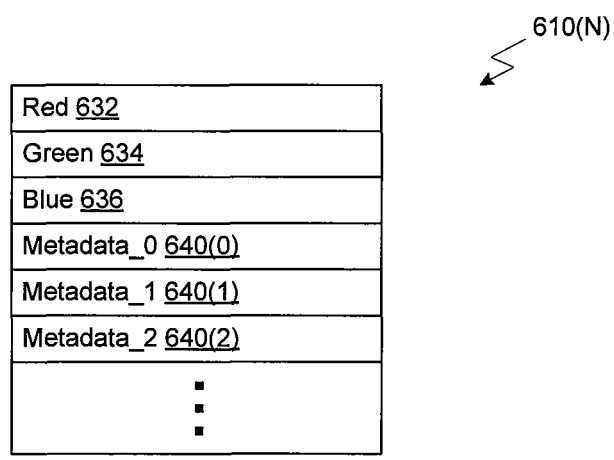

FIGS. 6A and 6B illustrate the file format for a panoramic image 410, according to one example embodiment of the present invention. As shown in FIG. 6A, a digital image file for a panoramic image 410 includes a header 602 as well as an array of pixel information 610. In one embodiment, the array of pixel information 610 may correspond to a spherical image plane captured using a laser scanning device with an integrated CMOS image sensor. The number of individual pixels associated with the array of pixel information 610 depends on the resolution of the panoramic image 410. For example, given a CMOS image sensor that captures full HD images at 1920×1080 resolution, where each image by the CMOS image sensor is associated with a horizontal viewing angle of approximately 30 degrees and a vertical viewing angle of approximately 18 degrees, the pixel array may include pixel data associated with 132 (12×11) separate and distinct images captured via the image sensor. This translates to more than 273 MP (megapixels) for each panoramic image 410, when capturing a full spherical view centered at a location. The array of pixel data 610 may be indexed such that each block of contiguous pixels in the array corresponds to a different image captured by the laser scanning device at a distinct orientation around location 412. For example, the first 2 MP correspond to a first image captured at a first orientation (i.e., azimuth and altitude). The next 2 MP correspond to a next orientation, and so forth. Thus, each image captured by the CMOS sensor and stored within the pixel array 610 may be indexed using a base index for the captured image at a particular orientation and a sub-index for the particular pixel associated with that orientation.

In another embodiment, the pixel array 610 may be arranged such that contiguous blocks of pixel data represent a vertical line of pixels at a particular azimuth with respect to a particular reference plane. For example, in the above example, each image is captured for a vertical viewing angle of 18 degrees and is captured at a vertical resolution of 1080 pixels. Consequently, each pixel represents a vertical arc minute (i.e., $\frac{1}{60}^{th}$ of 1 degree) of the spherical projection plane. Thus, each group of consecutive 10800 pixels represents one vertical scan line in the spherical panoramic image and is captured using the center column of pixel elements within the CMOS image sensor. The total number of vertical scan lines in the pixel array 610 is dependent on the horizontal pixel resolution that, if also equal to a horizontal arc minute, would require 21600 distinct vertical scanlines for a total number of approximately 233 MP. In some embodiments, a plurality of vertical scanlines are captured simultaneously using a portion of the pixels in the CMOS image sensor. For example, each image may be taken at 5 degree increments in azimuth, capturing 300 vertical scanlines simultaneously.

In other embodiments, the size of the pixel array may be significantly reduced by setting each pixel in the spherical projection plane to a location equal to a point of a spherical lattice such as a geodesic sphere. In such an arrangement, each pixel is equally spaced from all adjacent pixels in the spherical image plane. In this manner, pixel_0 610(0) of pixel array 610 may correspond to the top most pixel of the spherical panoramic image and pixel_N 610(N) of pixel array 610 may correspond to the bottom most pixel of the spherical panoramic image. In a geodesic sphere arrangement, each pixel represents a point on the projected sphere that is equidistant from an adjacent six pixels. If the resolution of the sphere is such that each pixel is approximately one arc minute from each other pixel, then the spherical panoramic image includes pixel data for approximately 160 million pixels. Resolution can be reduced significantly to save space. For example, at quarter the resolution (approximately 4 arc minutes between pixels), the size of the pixel array 610 is approximately 10 MP.

FIG. 6B illustrates the format for each pixel 610(N) in pixel array 610. In one embodiment, pixel 610(N) includes color data such as a red color value 632, a green color value 634, and a blue color value 636. Unlike conventional image data captured with a CMOS sensor alone, the pixel data 610(N) for the panoramic image 410 may be augmented by adding metadata 640. In one embodiment, pixel 610(N) includes four channels, three channels for color information (e.g., red color value 632, green color value 634, and blue color value 636), as well as a fourth channel that includes a depth value 640(0) captured using the laser scanning device, which specifies a depth of the surface in the building associated with the captured color for each pixel. Thus, in addition to a color for each pixel, pixel data 610(N) also includes a distance from the location 412 for each pixel along the ray projected from the location 412 to the surface associated with the pixel.

In some embodiments, pixel data 610(N) may include metadata 640 that is associated with building performance data. Metadata 640 may store an identifier for a particular data object associated with the building performance data. For example, metadata_0 640(0) may include an object identifier associated with a set of temperature data that reflects temperatures associated with the building captured for a location corresponding to that particular pixel at one or more points in time. Alternatively, the metadata 640 may store an identifier that indicates that a particular pixel is a member of a set of pixels that are associated with the same data object. For example, 200 pixels in a particular spherical panoramic image may represent a light switch on a wall of a building. Each of those 200 pixels may store an identifier that links that pixel to a data object for the light switch. Building performance data stored in the data object for the light switch may then be used to alter pixel data of an image generated based on any of the pixels associated with the identifier for the light switch data object. It will be appreciated that adding metadata 640 directly to the pixel information in the file for the panoramic image 410 is optional. Alternatively, a separate data structure may store metadata 640 along with an index that associates a particular set of metadata 640 with one or more pixels of panoramic image 410.

Importantly, each pixel 610(N) includes three or more channels for color information (e.g., RGB, $YC_rC_b$, CMYK) as well as one or more additional channels of metadata, which may include position information (e.g., a depth, or a vector that represents the position of a surface), object identifiers for external data structures, or raw building performance data (e.g., a temperature value). The addition of the metadata 640 to the normal color channels for a pixel enables application 150 to generate images for display that include graphical representations of building performance data without generating a complex 3D model of the building.

Figure 7:
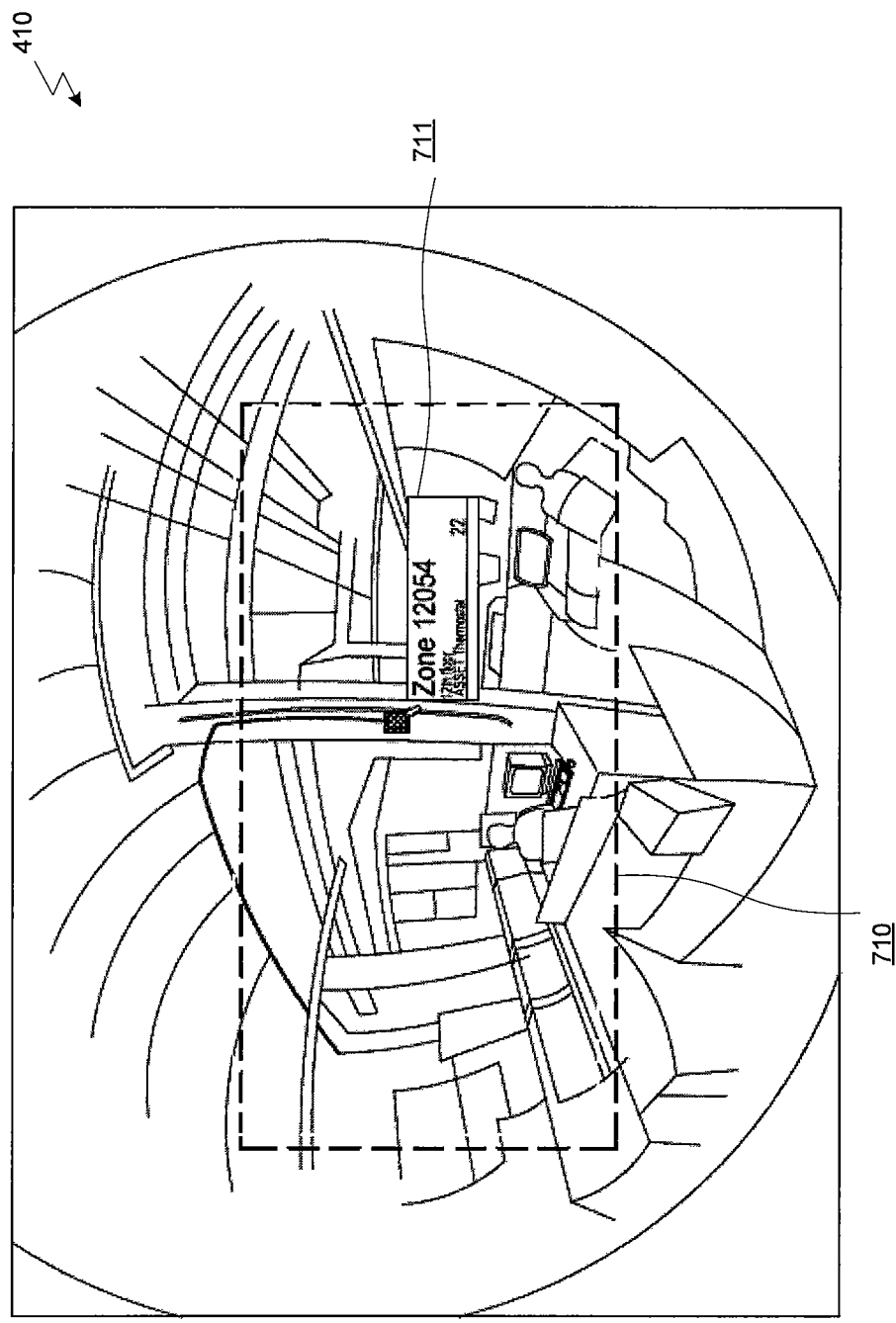
FIG. 7 illustrates an image of the building generated based on a spherical panoramic image, according to one embodiment of the present invention.

FIG. 7 illustrates an image 710 of the building generated based on a panoramic image 410, according to one embodiment of the present invention. As shown in FIG. 7, application 150 generates the image 710 based on a subset of pixels within the panoramic image 410. For example, the image 710 may be generated by projecting a ray from the center of the spherical image plane (i.e., location 412(N)) to the surface of the spherical image plane through a point corresponding to a pixel of a flat rectangular projection plane. The color of a pixel in the image 710 is then defined by the color component information for the nearest pixel on the spherical image plane. In one embodiment, the image 710 may correspond to a rectangular projection plane having 1920 pixels in the horizontal dimension and 1080 pixels in the vertical dimension. The rectangular projection plane is oriented such that the projection vector 414 is collinear with a normal vector at the center of the rectangular projection plane. In some embodiments, the color of each pixel in the image 710 is generated using an interpolation of one or more pixels in the panoramic image 410. In one embodiment, each pixel in image 710 reflects the "nearest" pixel in the spherical panoramic image data to the projected ray. In another embodiment, each pixel in image 710 reflects an interpolated value from at least two pixels in the spherical panoramic image data proximate to the projected ray.

For each pixel of the image 710, application 150 may determine whether that pixel is related to any building performance data objects. In one embodiment, application 150 may check metadata 640 to determine if the pixel is associated with any building performance data. If the pixel data 610(N) includes metadata 640, then application 150 may alter the display color for the pixel in the image 710 based on the metadata 640. For example, as shown in FIG. 7, some of the pixels 610 in the panoramic image 410 represent a thermostat located on a column in the building. The thermostat may be associated with a building performance data object for the thermostat that stores the current setting (i.e., temperature setpoint) of the thermostat. When generating the image 710, application 150 may alter the pixel color for any pixels associated with the thermostat data object to display as a uniform color such as green. Application 150 may then also generate a HUD graphic 711 associated with the thermostat data object and overlay the HUD graphic 711 over the image 710 proximate to any pixels associated with the thermostat data object. The HUD graphic 711 may include information associated with the thermostat data object such as an identifier for the data object (e.g., "Asset: Thermostat") and a value for the current setting of the thermostat (e.g., "22°").

In one embodiment, a majority of the pixels in image 710 reflect performance related data associated with metadata 640 included in one or more panoramic images 410. The values for each pixel in image 710 may be interpolated from a plurality of metadata 640, possibly from two or more panoramic images 410. For example, the metadata 640 related to the thermostat data object may be included in a first panoramic image 410(0) and additional metadata 640 related to an air vent may be included in a second panoramic image 410(1). The pixels in the image 710 may include graphical representations of the metadata 640 from the first panoramic image 410(0) as well as graphical representation of the metadata 640 from the second panoramic image 410(1). Furthermore, some pixels in image 710 may be a blend of a graphical representation related to both sets of metadata 640, such as by blending two color values using an alpha color channel (i.e., partial transparency).

In one embodiment, application 150 monitors an input device, such as a mouse cursor, and renders image 710 based on the position of the mouse cursor. For example, application 150 determines the location of a mouse cursor and uses the location to select a particular pixel of panoramic image data 410 based on the location of the mouse cursor. If metadata 640 associated with the selected pixel indicates that the pixel is associated with building performance data, then application 150 modifies image 710 to include a graphical representation of the building performance data. For example, when the mouse cursor rolls over any of the pixels in image 710 associated with the thermostat data object, application 150 changes the color value of any pixel associated with the thermostat and overlays HUD 711 over the image 710. When the mouse cursor rolls off any of the pixels associated with the thermostat, then application 150 changes image 710 such that HUD 711 is no longer overlaid on image 710 and the pixels of image 710 reflect the color values of the panoramic image 410.

It will be appreciated that generating the raw data used to generate image 710 is much simpler than building a full 3D model of the building in a CAD program based on the point cloud generated using a laser scanning device. In such a case, a drafter would need to create each of the objects seen in the panoramic image 410, including the floor, walls, ceiling, piping, thermostat, desks, chairs, etc. Each of these items would take time to complete at the level of detail shown in the panoramic image 410. In contrast, adding a relationship between building performance data and the raw color and depth information captured in a panoramic image 410 may be much simpler. In order to add an association between pixels in the captured panoramic image 410 and building performance data, a user may need to open the panoramic image 410 in application 150, locate the pixels associated with the physical thermostat in the panoramic image 410, and highlight or select the pixels associated with the thermostat using a traditional input device such as a mouse. Application 150 could then augment the pixel data 610 in the panoramic image 410 to include a reference to the thermostat building performance data object, stored externally to the panoramic image 410.

Figure 8A:
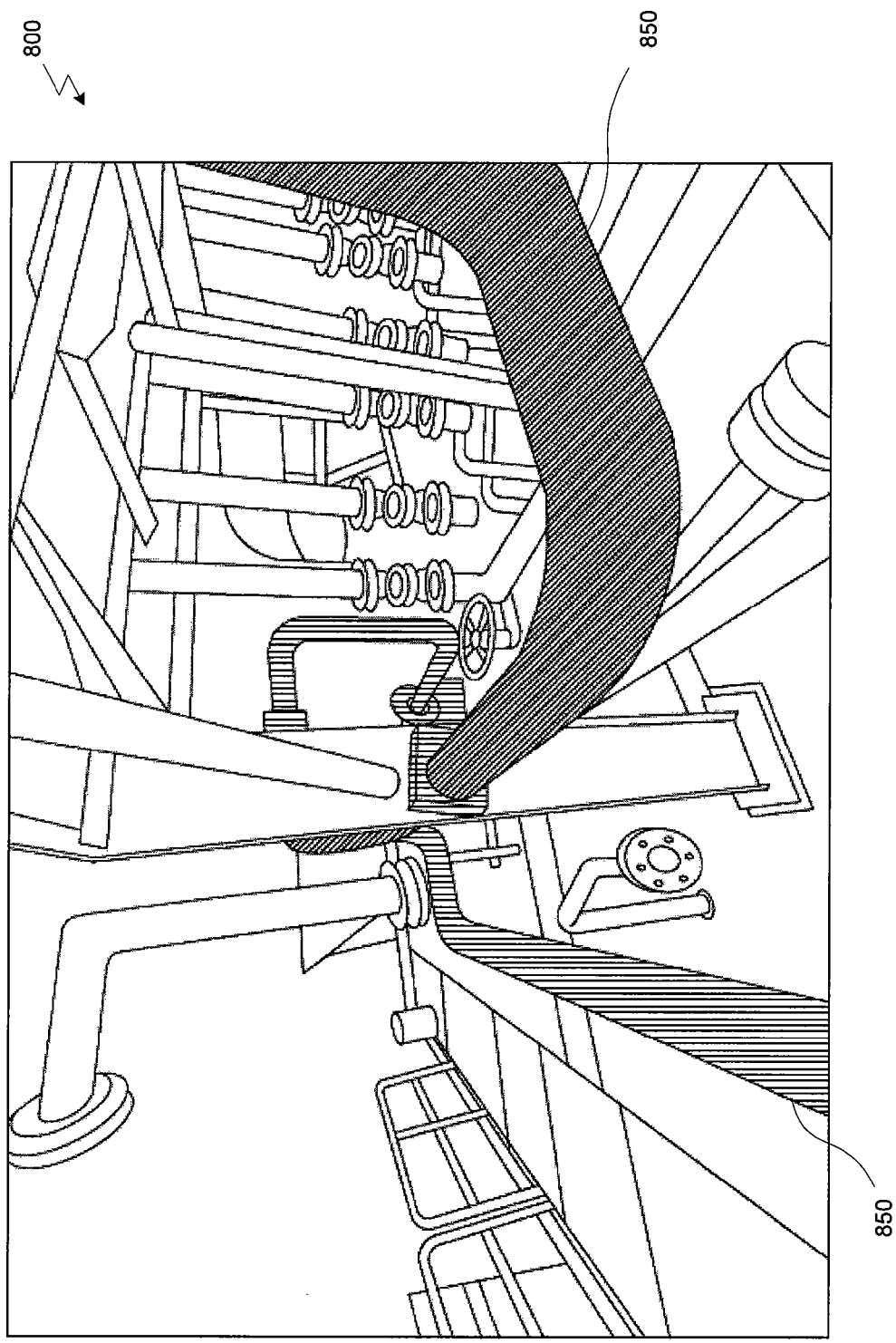
FIGS. 8A-8D illustrate virtual geometry that has been overlaid on a 2D projection of spherical panoramic image, according to one example embodiment of the present invention.
Figure 8B:
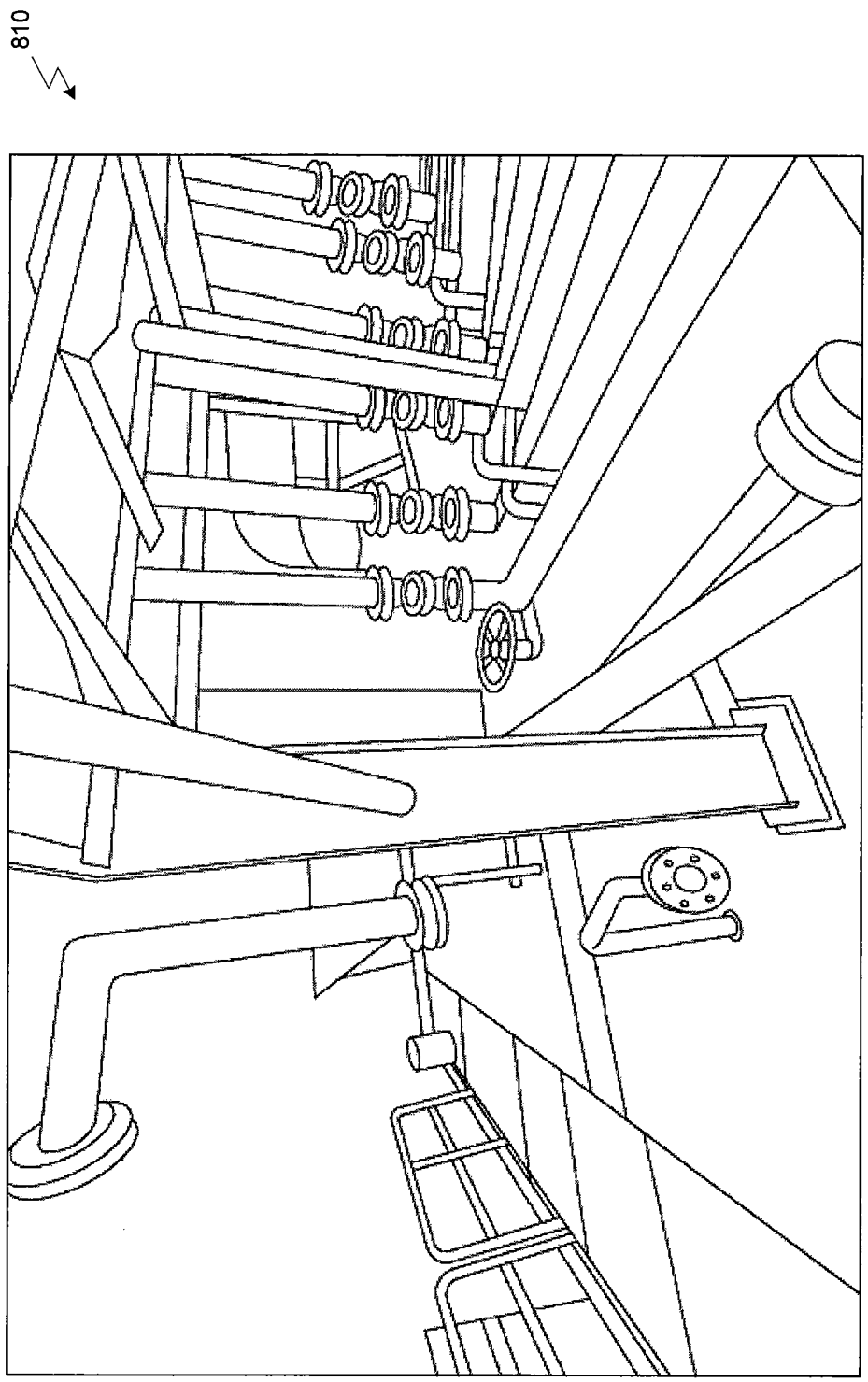
Figure 8C:
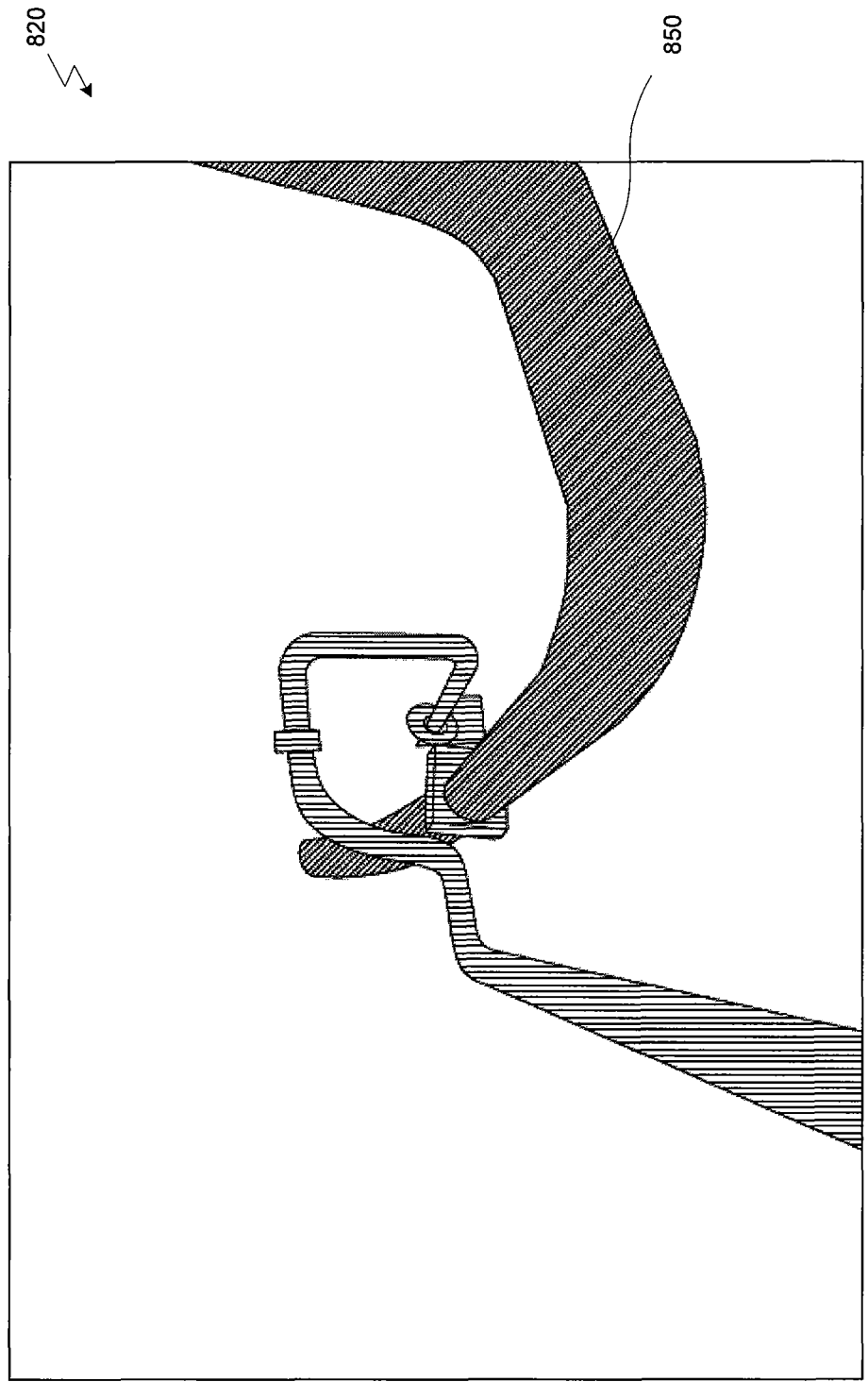

FIGS. 8A-8D illustrate virtual geometry that has been overlaid on a 2D projection of panoramic image 410, according to one example embodiment of the present invention. FIG. 8A shows an image 800 generated based on the panoramic image 410 and modified based on a computer-generated panoramic image that is rendered from a 3D model of virtual geometry (e.g., virtual pipes 850). As shown in FIG. 8B, a first panoramic image 810 (i.e., panoramic image 410) does not show the virtual pipes 850 because the image was captured using a laser scanning device in the physical building. Instead, the virtual pipes 850 are modeled in CAD software and shown in a second, computer-generated panoramic image 820 of the building, as shown in FIG. 8C, which includes a rendered representation of the virtual pipes 850 based on the 3D model. In one embodiment, a drafter may generate a 3D model of the virtual pipes 850 in a CAD program such as Autodesk® AutoCAD. The 3D model includes the geometry of the virtual pipes 850 relative to a coordinate system for the model. Application 150 may then import the model of the virtual pipes 850 and generate a corresponding, computer-generated panoramic image 820 based on a camera position (i.e., viewpoint) in the coordinate system that corresponds to the location 412 associated with the first panoramic image 810. In other words, the coordinates for the model geometry for the virtual pipes 850 relative to the camera position reflects the same position, scale, and orientation of the building relative to the location 412 of the panoramic image 410.

Application 150 may then blend the raw panoramic image 810 (i.e., panoramic image 410) captured using the laser scanning device with the computer-generated panoramic image 820 rendered from the CAD model. In one embodiment, the computer-generated panoramic image 820 includes position information (i.e., depth information) associated with each pixel. Application 150 may then use the position information to determine whether each pixel in a digital image 800 should be based on the raw panoramic image data 810 or whether the pixel should be based on the computer-generated panoramic image 820, thereby including a representation of the virtual geometry in the digital image 800. For example, for each pixel in the digital image 800, application 150 may compare a depth value stored in metadata 640(0) associated with a corresponding pixel in the panoramic image 810 with a depth value associated with the corresponding pixel in the computer-generated panoramic image 820. If the depth value associated with the corresponding pixel in the panoramic image file 810 is less than the depth value associated with the corresponding pixel in the computer-generated panoramic image 820 (i.e., the real surface shown in the panoramic image 810 is closer to the camera than the virtual geometry shown in the computer-generated panoramic image 820), then application 150 will generate a pixel value in digital image 800 based on the panoramic image 810. However, if the depth value associated with the corresponding pixel of the panoramic image file 810 is greater than or equal to the depth value associated with the corresponding pixel in the computer-generated panoramic image 820, then application 150 will generate a pixel value in digital image 800 based on the computer-generated panoramic image 820. Thus, the virtual geometry will be occluded by pixels in the panoramic image 810 that are closer to location 412 (i.e., viewpoint) than the virtual geometry in the 3D model.

Figure 8D:
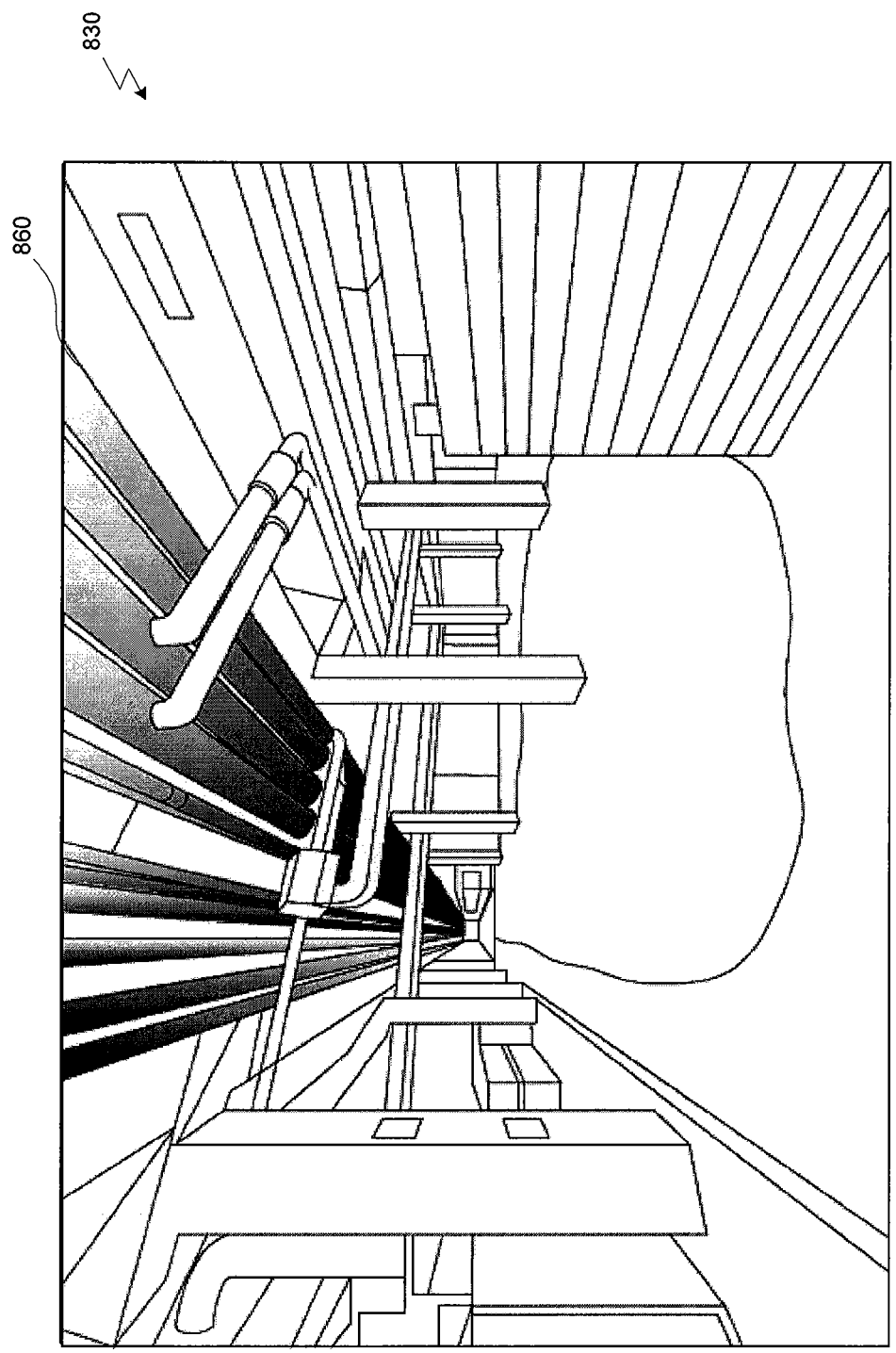

As shown in FIG. 8D, a digital image 830 may be generated according to the technique described above in connection with FIGS. 8A-8C. In the digital image 830, virtual pipes 860 may be rendered based on model geometry created in a 3D model. The color of the virtual pipes 860 is based on building performance data associated with the virtual pipes 860. Thus, the digital image 830 includes modified pixel data that reflects values based on the building performance data associated with the virtual geometry.

For example, sensors may collect data related to a temperature or flow rate of a gas or liquid flowing through corresponding physical pipes in the building. Instead of modeling the entire building, a draftsperson may generate a model of the pipes associated with the building performance data. Application 150 may then analyze the 3D model and the building performance data to render the surfaces of the virtual geometry in a color associated with values in the building performance data. The sensors may record temperatures of liquid or gas at multiple locations along the real pipe in the building. Application 150 renders the color of surface geometry associated with the model of the virtual pipes based on the values of the building performance data that is collected at those locations. The color of a particular pixel may be interpolated based on a distance of the point on the surface of the model from one or more locations associated with the sensors. In another embodiment, the pixels may be colored using a uniform color based on the value of the performance related data (e.g., the entire surface geometry of the pipe may be colored blue if the temperature indicates the contents of the pipe at a particular location are below a threshold temperature). The computer-generated panoramic image showing the rendered virtual geometry is blended with the corresponding panoramic image to generate a digital image 830 for display. FIG. 8D illustrates virtual pipes 860 that have been rendered with a gradient color to reflect temperature data related to the pipes.

It will be appreciated by one of skill in the art that application 150 may render different sets of building performance data using multiple rendering techniques. For example, the digital images 800, 830 may include both direct rendering techniques for logical data and complex surface shading techniques or a heads-up-display for scalar data. Furthermore, application 150 may be configured to generate multiple computer-generated panoramic images 820 that reflect a rendering of multiple 3D models of virtual geometry, and then generate a digital image 800 based on the panoramic image 810 and two or more computer-generated spherical panoramic images 820.

Figure 9:
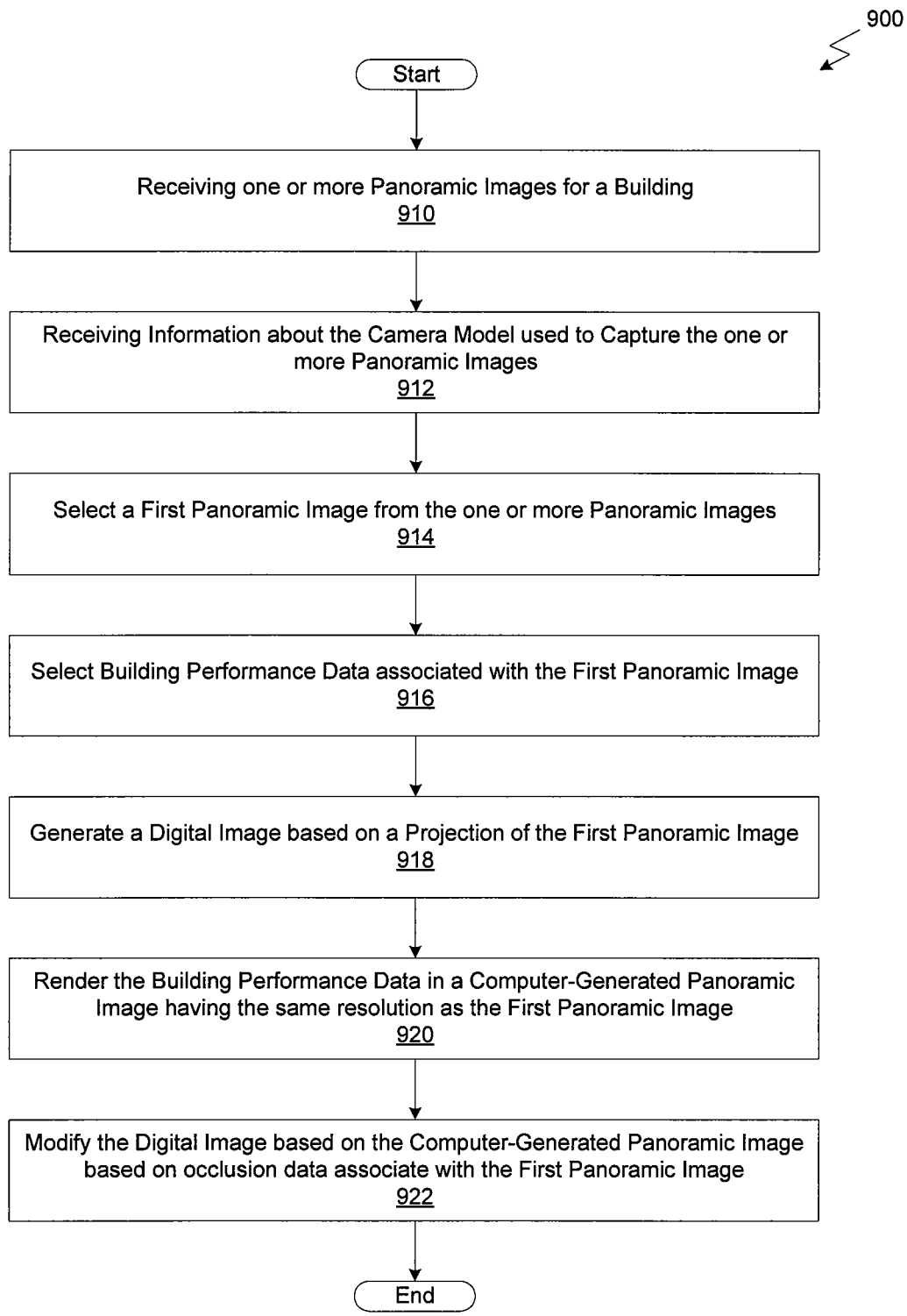
FIG. 9 is a flowchart of method steps for augmenting spherical panoramic images with performance related data for a building, according to one example embodiment of the present invention.

FIG. 9 is a flowchart of method steps 900 for augmenting panoramic images 410 with performance related data for a building, according to one example embodiment of the present invention. Although the method steps are described in conjunction with the systems of FIGS. 1-8D, persons skilled in the art will understand that any system configured to perform the method steps, in any order, is within the scope of the inventions.

The method 900 begins at step 910, where application 150 receives one or more panoramic images 410 associated with a building. At step 912, application 150 receives information about the camera model used to capture the one or more panoramic images 410. The camera model information may be used to determine the format (i.e., resolution) of the digital image files of the panoramic images 410. In some embodiments, the camera model information may be used to register the one or more panoramic images to a coordinate system associated with the building. At step 914, application 150 selects a first panoramic image 410(0) from the one or more panoramic images 410. For example, application 150 may enable a user to select the image from a list of images using a mouse or keyboard.

At step 916, application 150 selects building performance data associated with the first panoramic image 410(0). The building performance data may be referenced in metadata 640 of the first panoramic image 410(0). At step 918, application 150 generates a digital image 800 that represents a 2D projection of the first panoramic image 410(0) data that shows the building from a location associated with the first panoramic image 410(0). At step 920, application 150 renders the building performance data to generate a computer-generated panoramic image 820 having the same resolution as the first panoramic image 410(0). At step 922, application 150 modifies the digital image 800 based on the computer-generated panoramic image 820 using occlusion testing that compares position data included in the first panoramic image 410(0) with position data included in the computer-generated panoramic image 820. The digital image 800 blends the panoramic image 410, augmented with metadata by application 150, with the computer-generated panoramic image 820 that includes a graphical representation of building performance data.

It will be appreciated that application 150 may be configured to continuously update the digital image 800 based on a different camera orientation specified by a user of system 100 in order to create an immersive, virtual reality experience that allows a user to "walk-through" the virtual building. In this case, application 150 repeats steps 914 through 922 for each subsequent image 800 based on navigation commands entered by a user.

In sum, the present application describes a system and method for augmenting panoramic images with performance related data for a building in the context of a virtual "walk-through" experience. The disclosed system includes a memory coupled to a processor configured to receive panoramic image data, generate a digital image based on the panoramic image data, and modify the digital image to include a graphical representation of the performance related data. The processor maps performance related data to the coordinate system of the panoramic images such that the graphical representation may be generated without converting the panoramic image data into a complex 3D model. The graphical representation of the performance related data may be rendered using a variety of methods, such as by changing the appearance of objects in the digital image or by adding objects to the digital image using an overlay technique.

One advantage of the disclosed approach is that a user may visualize the performance related data within the context of a high-resolution photograph that is easily captured using a conventional laser scanning device. Conventional techniques typically require a draftsman to generate a high-quality three-dimensional model of the building using only the depth information captured by the laser scanning device. In contrast, the disclosed approach does not require the creation of a high-quality model of the building and instead maps building performance data directly to the coordinate system of the panoramic image (i.e., a spherical projection plane surrounding a central pivot point). The overall experience enables a virtual walkthrough to be displayed to a user using high-resolution panoramic photographs with limited modifications performed on the captured panoramic image data (e.g., linking particular pixels in the panoramic image data to performance related data objects).

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

In view of the foregoing, the scope of the present invention is determined by the claims that follow.

What is claimed is:

1. A method for augmenting panoramic images with performance related data for a building, the method comprising:
    receiving panoramic image data for a spherical panoramic image, the panoramic image data comprising color information and metadata for each pixel in the spherical panoramic image;
    generating a digital image comprising a two-dimensional (2D) projection plane based on at least a portion of the spherical panoramic image; and
    modifying the digital image to include a graphical representation of performance related data based on the metadata included in the panoramic image data.

2. The method of claim 1, wherein the panoramic image data comprises spherical panoramic image data that correspond to a spherical projection plane centered at a location in the building, and wherein each pixel in the spherical panoramic image data includes at least a red component, a green component, a blue component, and a depth component.

3. The method of claim 2, wherein each pixel in the spherical panoramic image data corresponds to a point on the spherical projection plane associated with a geodesic lattice circumscribed within the spherical projection plane.

4. The method of claim 1, wherein the metadata comprises a link to a data structure, external to the panoramic image data, that stores performance related data for the building.

5. The method of claim 1, wherein generating the digital image comprises, for each pixel in the digital image, projecting a ray through a point in the two-dimensional projection plane to select one or more pixels in the panoramic image data that correspond to the ray, and determining a color for the pixel based on the color information included in the one or more pixels.

6. The method of claim 5, wherein modifying the digital image comprises, for each pixel in the digital image, rendering the pixel with a different color than the color determined for the pixel based on the metadata included in one or more pixels in the panoramic image data.

7. The method of claim 1, wherein modifying the digital image comprises:
    generating a corresponding computer-generated panoramic image data by rendering a graphical representation of the performance related data in a coordinate system corresponding to the panoramic image data; and
    for each pixel in the digital image:
        determining whether a first depth associated with a corresponding pixel in the panoramic image data is greater than a second depth associated with a corresponding pixel in the computer-generated panoramic image data, and
        if the first depth is greater than the second depth, then modifying at least one component of the pixel based on the corresponding pixel in the computer-generated panoramic image data, or
        if the first depth is not greater than the second depth, then not modifying the pixel.

8. The method of claim 7, wherein rendering the graphical representation of the performance related data comprises:
generating a three-dimensional model of one or more components in a CAD (computer-aided drafting) program, wherein the one or more components are defined in the three-dimensional model according to a Cartesian coordinate system; and
generating the computer-generated panoramic image by projecting a plurality of rays from a viewpoint in the Cartesian coordinate system in directions corresponding to the orientation of pixels in the first plurality of pixels relative to the viewpoint, wherein a location of the viewpoint in the three-dimensional model corresponds to a location associated with the panoramic image data.

9. The method of claim 7, wherein the computer-generated panoramic image data represents a temperature field for at least a portion of the building.

10. A non-transitory computer-readable storage medium containing a program which, when executed by a processor, performs an operation for augmenting panoramic images with performance related data for a building, the operation comprising:
receiving panoramic image data for a spherical panoramic image, the panoramic image data comprising color information and metadata for each pixel in the spherical panoramic image;
generating a digital image comprising a two-dimensional (2D) projection plane based on at least a portion of the spherical panoramic image; and
modifying the digital image to include a graphical representation of performance related data based on the metadata included in the panoramic image data.

11. The non-transitory computer-readable storage medium of claim 10, wherein the panoramic image data comprises spherical panoramic image data that correspond to a spherical projection plane centered at a location in the building, and wherein each pixel in the spherical panoramic image data includes at least a red component, a green component, a blue component, and a depth component.

12. The non-transitory computer-readable storage medium of claim 11, wherein each pixel in the spherical panoramic image data corresponds to a point on the spherical projection plane associated with a geodesic lattice circumscribed within the spherical projection plane.

13. The non-transitory computer-readable storage medium of claim 10, wherein the metadata comprises a link to a data structure, external to the panoramic image data, that stores performance related data for the building.

14. The non-transitory computer-readable storage medium of claim 10, wherein generating the digital image comprises, for each pixel in the digital image, projecting a ray through a point in the two-dimensional projection plane to select one or more pixels in the panoramic image data that correspond to the ray, and determining a color for the pixel based on the color information included in the one or more pixels.

15. The non-transitory computer-readable storage medium of claim 14, wherein modifying the digital image comprises, for each pixel in the digital image, rendering the pixel with a different color than the color determined for the pixel based on the metadata included in one or more pixels in the panoramic image data.

16. The non-transitory computer-readable storage medium of claim 10, wherein modifying the digital image comprises:

generating a corresponding computer-generated panoramic image data by rendering a graphical representation of the performance related data in a coordinate system corresponding to the panoramic image data; and
for each pixel in the digital image:
determining whether a first depth associated with a corresponding pixel in the panoramic image data is greater than a second depth associated with a corresponding pixel in the computer-generated panoramic image data, and
if the first depth is greater than the second depth, then modifying at least one component of the pixel based on the corresponding pixel in the computer-generated panoramic image data, or
if the first depth is not greater than the second depth, then not modifying the pixel.

17. The non-transitory computer-readable storage medium of claim 16, wherein rendering the graphical representation of the performance related data comprises:
generating a three-dimensional model of one or more components in a CAD (computer-aided drafting) program, wherein the one or more components are defined in the three-dimensional model according to a Cartesian coordinate system; and
generating the computer-generated panoramic image by projecting a plurality of rays from a viewpoint in the Cartesian coordinate system in directions corresponding to the orientation of pixels in the first plurality of pixels relative to the viewpoint, wherein a location of the viewpoint in the three-dimensional model corresponds to a location associated with the panoramic image data.

18. A system for augmenting panoramic images with performance related data for a building, the system comprising:
a memory storing one or more panoramic images associated with the building; and
a processor coupled to the memory and configured to:
receive panoramic image data for a spherical panoramic image, the panoramic image data comprising color information and metadata for each pixel in the spherical panoramic image,
generate a digital image comprising a two-dimensional (2D) projection plane based on at least a portion of the spherical panoramic image, and
modify the digital image to include a graphical representation of performance related data based on the metadata included in the panoramic image data.

19. The system of claim 18, wherein the panoramic image data comprises spherical panoramic image data that correspond to a spherical projection plane centered at a location in the building, and wherein each pixel in the spherical panoramic image data includes at least a red component, a green component, a blue component, and a depth component.

20. The system of claim 18, further comprising a sensor network coupled to the memory and configured to collect performance related data for the building.

21. The method of claim 1, wherein generating the digital image comprises generating the 2D projection plane based on a projection vector originating from a center of the spherical panoramic image.

22. The method of claim 21, wherein a normal vector of the 2D projection plane is collinear with the projection vector.

* * * * *